United States Patent [19]

Yoshida et al.

[11] Patent Number: 5,323,252
[45] Date of Patent: Jun. 21, 1994

[54] LIQUID CRYSTAL DISPLAY DEVICE WITH OPAQUE METAL ELECTRODES PARALLEL TO TRANSPARENT ELECTRODES WITH NOTCH AT THEIR INTERSECTION

[75] Inventors: Akio Yoshida, Hiratsuka; Kazuya Ishiwata, Yokosuka; Junko Sato, Hiratsuka, all of Japan

[73] Assignee: Canon Kabushiki Kaisha, Tokyo, Japan

[21] Appl. No.: 16,669

[22] Filed: Feb. 11, 1993

Related U.S. Application Data

[63] Continuation of Ser. No. 737,662, Jul. 30, 1991, abandoned.

[30] Foreign Application Priority Data

Jul. 31, 1990 [JP] Japan ............... 2-201431

[51] Int. Cl.⁵ ............... G02F 1/1343; G02F 1/1335
[52] U.S. Cl. ............... 359/54; 359/67; 359/87
[58] Field of Search ............... 350/336, 339 F; 359/54, 359/67, 87

[56] References Cited

U.S. PATENT DOCUMENTS

| | | | |
|---|---|---|---|
| 4,763,994 | 8/1988 | Kaneko et al. | 350/336 |
| 4,818,078 | 4/1989 | Mouri et al. | 350/336 |
| 4,824,213 | 4/1989 | Morokawa | 350/336 |
| 4,824,218 | 4/1989 | Kuno et al. | 350/336 |
| 5,007,716 | 4/1991 | Hanyu et al. | 350/336 |

FOREIGN PATENT DOCUMENTS

| | | | |
|---|---|---|---|
| 0249120 | 12/1985 | Japan | 359/67 |
| 0210325 | 9/1986 | Japan | 350/336 |
| 0227126 | 9/1989 | Japan | 350/336 |

Primary Examiner—Anita P. Gross
Attorney, Agent, or Firm—Fitzpatrick, Cella, Harper & Scinto

[57] ABSTRACT

A liquid crystal display device is provided with a pair of mutually opposed transparent substrates, a pair of groups of transparent stripe electrode formed respectively on the internal faces of the substrates in mutually crossing manner, and liquid crystal positioned between the groups of stripe electrodes. The groups of stripe electrodes are provided respectively with opaque metal members for reducing the electrical resistance of the stripe electrodes. The opaque metal members are so formed as not to mutually overlap and as to complementarily constitute light shields in non-display areas.

3 Claims, 5 Drawing Sheets

LIQUID CRYSTAL DISPLAY DEVICE WITH OPAQUE METAL ELECTRODES PARALLEL TO TRANSPARENT ELECTRODES WITH NOTCH AT THEIR INTERSECTION

This application is a continuation of application Ser. No. 737,662, filed Jul. 30, 1991, now abandoned.

BACKGROUND OF THE INVENTION

1. Field of the Invention

The present invention relates to a liquid crystal display device of matrix type, and more particularly to a liquid crystal display device in which non-display areas are light shielded by opaque metal electrodes.

2. Related Background Art

The surface-stabilized ferroelectric liquid crystal device proposed by Clark and Lagerwall (hereinafter called SSFLC; see the Japanese Laid-Open Patent Application No. 56-107216 or the U.S. Pat. No. 4,367,924) is a bistable ferroelectric liquid crystal (FLC) device in which the ferroelectric liquid crystal can assume two stable oriented states.

In an SSFLC device of matrix type in which a ferroelectric liquid crystal layer is sandwiched between a pair of electrode layers of mutually crossing stripe-patterns, a pixel area defined by the crossing area of the mutually opposed electrodes can be switched to one of the aforementioned two states by the application of a voltage from an external driving circuit. However, there may result following drawbacks in the non-display areas outside said crossing areas or pixels areas.

Firstly, because of the bistability of SSFLC, the liquid crystal present in such non-pixel areas also assume two oriented states, which appear as mixed black and white areas when observed through polarizers attached on both faces of the display device. For this reason a liquid crystal display (LCD) panel of a large area contains areas showing unintended display states, thereby giving a granular appearance to the entire display panel.

Figure 5A:
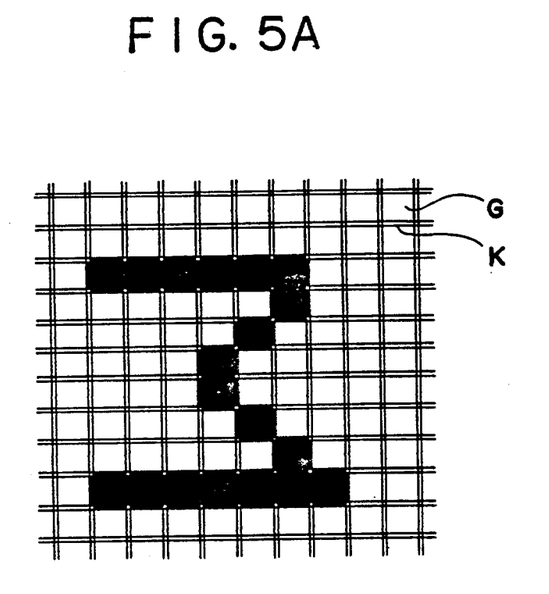
FIGS. 5A and 5B are schematic views showing display state of another liquid crystal display device of the prior art.
Figure 5B:
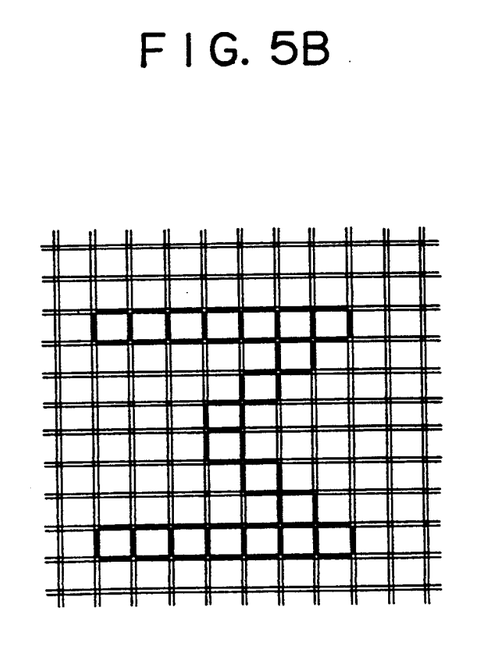

Secondly, there is known a phenomenon called "interpixel switching". As shown in FIG. 5A, if a pixel G is in the "black" state, an adjacent interpixel area K gradually changes to black. However, after the pixel is inverted to white by an external voltage application, the interpixel area, which is not subjected to said voltage application, remains in the black state, thus inducing an apparent after image in a large-area FLC panel, remaining for a period of several seconds to more than several tens of seconds.

The transparent stripe electrodes in ordinary LCD devices are composed of indium oxide, which however shows an increased wiring resistance particularly in a large-area LCD panel, with the reduction in width of the wirings. Such increased resistance results in a signal delay, proportional to the product of the capacitance of the liquid crystal layer and the wiring resistance, and such signal delay is being avoided by a reduction in resistance, achieved by forming a metal electrode on the upper end of each stripe electrode.

Such metal electrode may be utilized for light shielding in the inter-pixel areas, by an electrode patterning technology for use in the liquid crystal shutter array, as disclosed for example in the Japanese Patent Publication Sho 63-38689. If this technology is applied to the stripe electrode patterns, the mutually opposed metal electrodes are to be shaped as indicated by 342 respectively in FIGS. 3A and 3B.

Figure 4:
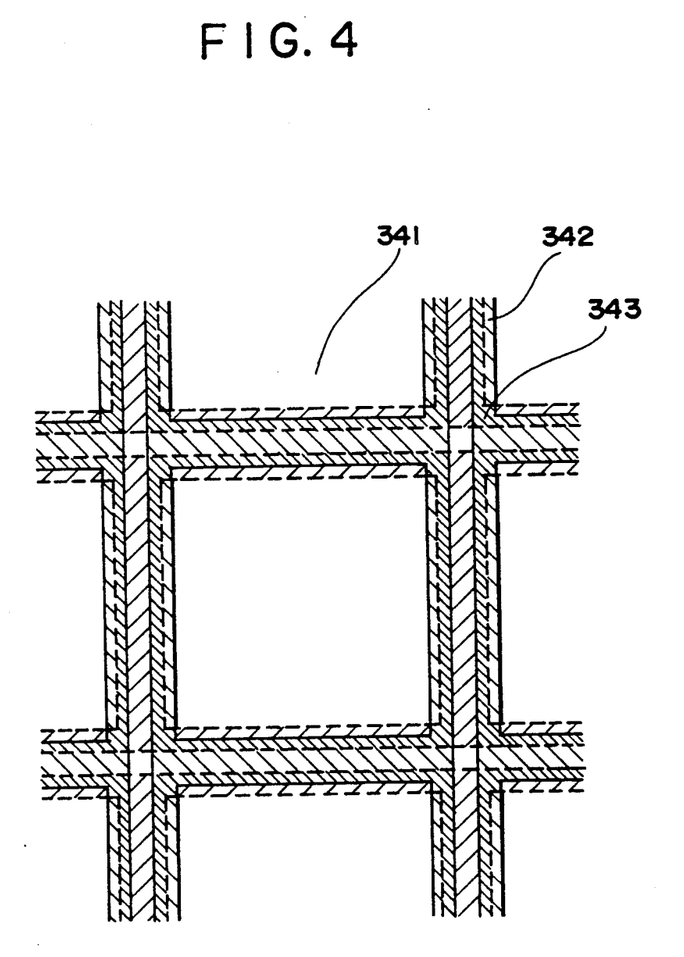
FIG. 4 is a schematic view showing the electrode patterns of FIGS. 3A and 3B in mutually superposed state.

However, if the stripe electrode patterns are mutually positioned according to this method in a large-area SSFLC panel, the superposed area 43 of the upper and lower metal electrodes 42, as shown in FIG. 4, occupies a considerable portion.

Such metal electrode is generally deposited with a thickness of 500–5,000 Å A on the transparent electrode, and the probability of short-circuiting of the upper and lower metal electrodes increases drastically at said superposed area 43, as the gap therebetween is as small as 1.5 $\mu$m particularly in case of a ferroelectric liquid crystal display panel.

SUMMARY OF THE INVENTION

In consideration of the foregoing, the object of the present invention is to provide a liquid crystal display device with metal electrode patterns which reduce the resistance of the stripe electrode and achieve light shielding in the inter-pixel areas while reducing the probability of short-circuiting of upper and lower electrodes.

The above-mentioned object can be attained, according to the present invention, by a liquid crystal display device provided with:

a pair of mutually opposed translucent substrates;

a pair of groups of translucent stripe electrode formed respectively on the internal faces of said substrates in mutually crossing manner; and liquid crystal positioned between said groups of stripe electrodes;

wherein said groups of stripe electrodes are provided with opaque metal members for reducing the electrical resistance of said stripe electrodes, and said opaque metal members are so formed as not to mutually overlap and as to complementarily constitute light shields in non-display areas.

In another aspect, the present invention provides a liquid crystal display device provided with liquid crystal sealed between a pair of mutually opposed translucent substrates, one of which is provided with a group of translucent stripe-shaped common electrodes while the other of which is provided with a group of translucent stripe-shaped signal electrodes in such a manner as to form pixels at the crossing areas of said common electrodes and said signal electrodes;

wherein each common electrode is provided thereon with a metal electrode of common side and opaque member(s) of common side perpendicular thereto;

each signal electrode is provided thereon with a metal electrode of signal side and opaque member(s) of signal side perpendicular thereto;

among the inter-pixel areas, areas positioned between the signal electrodes are shielded from light by the opaque members of common side while areas positioned between the common electrodes are shielded from light by the opaque members of signal side; and in each crossing area of a metal electrode of common side and a metal electrode of signal side, at least either one of said metal electrodes is notched in advance.

In the above-mentioned structures, the liquid crystal is driven by voltage application between the mutually opposed stripe electrodes, whereby a pixel is defined in the crossing area of said stripe electrodes, but the liquid crystal in the non-displaying inter-pixel area has unstable orientation which is not fixed. However there can be obtained display without granular impression or remnant image because the non-displaying areas are shielded from light by the opaque members of the stripe electrodes. Also since the mutually opposed metal members do not mutually overlap, the cell gap is not decreased by such overlapping so that the liquid crystal can be driven without the fear of short-circuiting between the opposed substrates.

DETAILED DESCRIPTION OF THE PREFERRED EMBODIMENTS

The opaque metal electrode to be employed in the present invention may be composed of Mo only, or of a two-layered structure of Al and Cr. The thickness of said opaque metal electrode is preferably 500 Å or larger in order to obtain a sufficiently low resistance, and 1000 Å or larger for obtaining sufficient light shielding. On the other hand, an excessively thick opaque metal electrode may result in a defect in the orientation of liquid crystal or in an over-etching in the manufacturing process. Thus the thickness of said electrode is preferably 5,000 Å or less, and 3,000 Å or less for reducing the defects in the metal electrode. Consequently the thickness of the opaque metal electrode is preferably in a range of 500–5,000 Å, more preferably 1,000–3,000 Å.

In the following there will be explained an example of preparation of the device, with reference to the attached drawings.

EXAMPLE

Figure 1A:
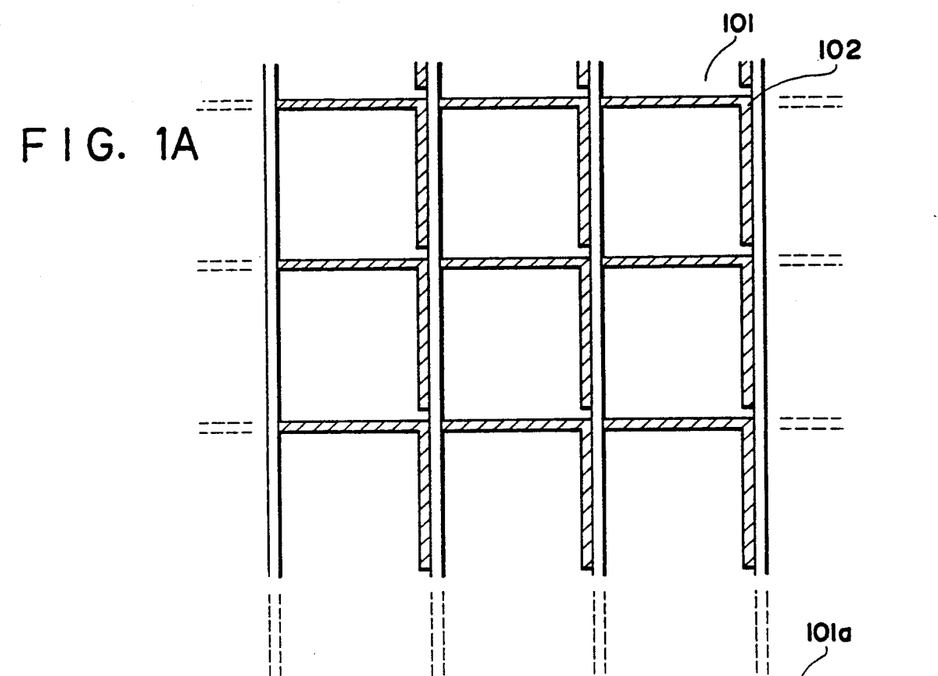
FIGS. 1A and 1B are schematic views of metal electrode patterns in an embodiment of the present invention.
Figure 1B:
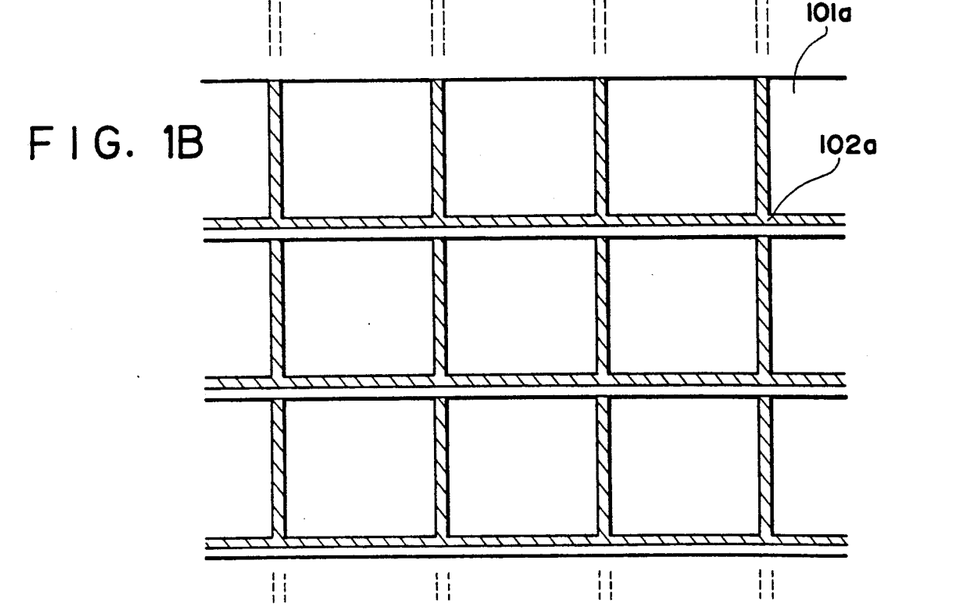

FIGS. 1A and 1B respectively show metal electrode patterns of segment side and common electrode side in an embodiment of the present invention. Said electrode patterns are featured by the presence of opaque electrode patterns 102, 102a on stripe electrodes 101, 101a. These electrode patterns are formed in the following manner.

At first, on a glass substrate for liquid crystal display device, an ITO (indium tin oxide) film of a thickness of 700 Å is formed by sputtering as a transparent conductive film, and a chromium film of a thickness of 500 Å and an aluminum film of a thickness of 3,000 Å are deposited in this order for forming an opaque metal electrode.

Then a photoresist layer is formed on said substrate, exposed through a metal pattern mask and developed. The photoresist pattern is used at first for forming aluminum pattern with a phosphoric acid etchant for aluminum, and then for etching chromium with an etchant therefor, thereby forming opaque metal electrode patterns 102, 102a.

Then a photoresist layer is again formed to obtain stripe patterns 101, 101a in the transparent conductive films, thereby completing the patterning operation. On the thus prepared electrode pattern of each of the substrates of the segment and common sides, polyimide resin SE-100 (manufactured by Nissan Chemical Co., Ltd.) is applied by offset printing, and is subjected to a rubbing process. Subsequently, said substrates are assembled in mutually opposed relationship with said stripe patterns in mutually perpendicular manner as already known, thereby obtaining a liquid crystal cell.

Figure 2:
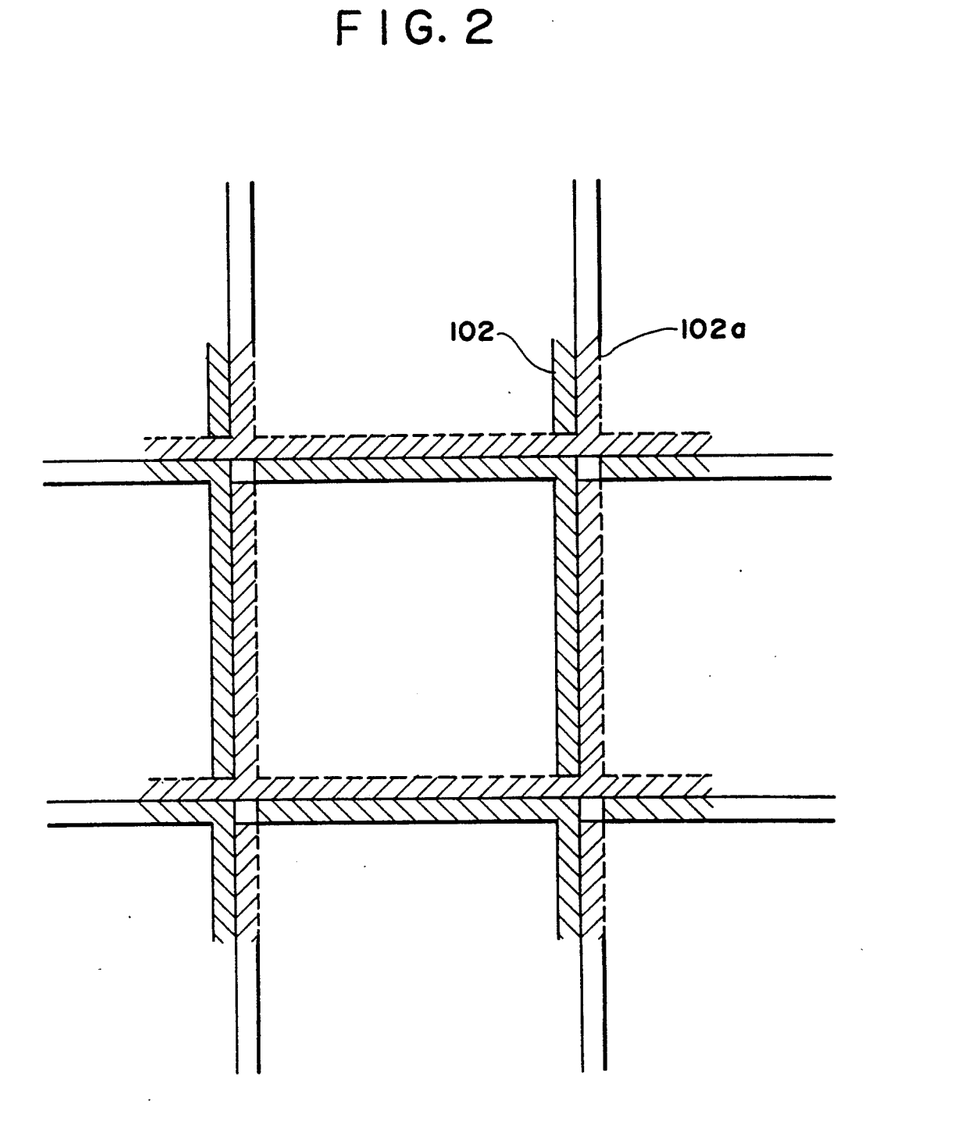
FIG. 2 is a schematic view showing the electrode patterns of FIGS. 1A and 1B in mutually superposed state.
Figure 3A:
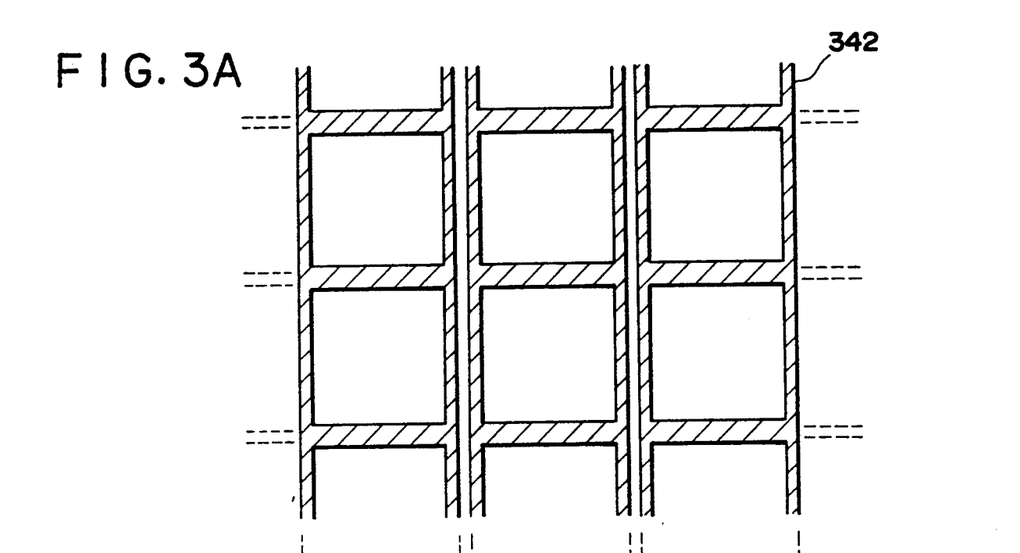
FIGS. 3A and 3B are schematic views of metal electrode patterns of the prior art.
Figure 3B:
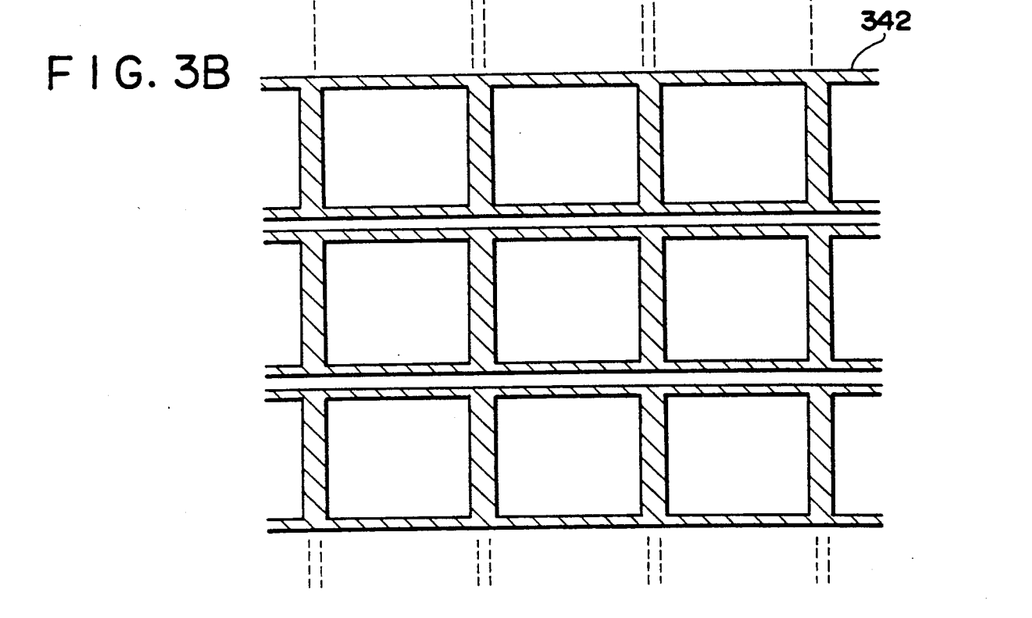

FIG. 2 illustrates the state in the vicinity of a pixel of the liquid crystal cell, which structure lacks the overlapping area of the upper and lower metal electrodes as shown by 343 in the conventional structure in FIG. 4. Also, when the electrode patterns of the present invention is applied to a ferroelectric liquid crystal device for example with a cell gap of 1.5 $\mu$m, the minimum thickness between the metal electrodes and the transparent electrodes is:

$$1.5-(0.05+0.3)=1.15 \ \mu m$$

which is larger than the thickness:

$$1.5-(0.05+0.3)\times 0.8 \ \mu m$$

in the overlapping part of the metal patterns in the conventional structure, so that the short-circuiting of the electrodes can be significantly reduced. The electrical resistance of the stripe electrode, principally governed by the width of the metal electrode lying along the stripe, is not essentially different from that of the conventional pattern shown in FIGS. 3A and 3B. The stripe electrode of the present embodiment has a wiring resistance of 2 k$\Omega$ in case of a stripe width of 250 $\mu$m of the transparent electrode, a stripe length of 25 cm of the transparent electrode and a width of 30 $\mu$m of the metal electrode, thus achieving a significant resistance reduction in comparison with a resistance of 50 k$\Omega$ of the transparent electrode alone.

As explained in the foregoing, according to the embodiments of the present invention, the non-displaying areas are shielded from light by patterns of opaque metal members in such a manner that said metal members do not mutually overlap. Consequently, in comparison with the case involving such overlapping, the minimum gap between the upper and lower electrodes can be increased to significantly reduce the short-circuitings between said upper and lower electrodes. Also there can be avoided the drawbacks specific to the SSFLC device such as presence of black and white areas in the inter-pixels areas and inter-pixel switching phenomenon. Furthermore, there can be obtained significant improvements in the driving conditions, such as a widened margin in the driving voltage, through a significant reduction in the resistance of the stripe electrodes.

What is claimed is:

1. A ferroelectric liquid crystal display device comprising:
   a pair of transparent substrate mutually opposed and spaced apart a distance of at least 1.5 $\mu$m;
   a pair of groups of transparent stripe electrodes formed respectively on the internal faces of said substrates in mutually crossing manner; and
   a liquid crystal positioned between said groups of stripe electrodes;
   wherein said groups of stripe electrodes are provided respectively with opaque metal members with thickness of 500–5000 Å for reducing the electrical resistance of said stripe electrodes, and for masking a residual image produced by said interpixel switching, said opaque metal members being formed so as not to mutually overlap and so as to complementarily constitute light shields in non-display areas.

2. A device according to claim 1, wherein the opaque metal members formed on one substrate are different in form from those formed on the other substrate.

3. A ferroelectric liquid crystal device comprising:

a liquid crystal sealed between a pair of transparent substrates mutually opposed and spaced apart at a distance of at least 1.5 μm, one of said substrates being provided with a group of transparent stripe-shaped common electrodes and the other of the substrates being provided with a group of transparent stripe-shaped signal electrodes so as to form pixels at the crossing areas of said common electrodes and said signal electrodes;

wherein each common electrode is provided in contact thereon with a first metal electrode parallel to said common electrode and with a second metal electrode normal to said first metal electrode;

wherein each signal electrode is provided in contact thereon with a third metal electrode parallel to said signal electrode and with a fourth metal electrode normal to said third metal electrode; and among the inter-pixel areas, areas positioned between adjacent common and adjacent signal electrodes are shielded from light by the first, second, third and fourth metal electrodes, wherein a residual image produced by the interpixel switching is masked by (i) the second metal electrode arranged to cover a gap between the adjacent signal electrodes and (ii) the fourth electrode arranged to cover a gap between the adjacent common electrodes; and at least one of said common or signal metal electrodes is notched in advance in each crossing area.

* * * * *

UNITED STATES PATENT AND TRADEMARK OFFICE
CERTIFICATE OF CORRECTION

PATENT NO. : 5,323,252
DATED : June 21, 1994
INVENTOR(S) : AKIO YOSHIDA, ET AL.

It is certified that error appears in the above-identified patent and that said Letters Patent is hereby corrected as shown below:

ON TITLE PAGE

In [54] Title: "NOTCH AT THEIR INTERSECTION" should read --NOTCHES AT THEIR INTERSECTIONS--.

In [57] ABSTRACT, Line 3: "electrode" should read --electrodes--.

COLUMN 1

Lines 4-5, "NOTCH AT THEIR INTERSECTION" should read --NOTCHES AT THEIR INTERSECTIONS--.

COLUMN 2

Line 26, "electrode" should read --electrodes--.

COLUMN 4

Line 58, "substrate" should read --substrates--.

COLUMN 5

Line 18, "electrodes;" should read --electrodes,--.

UNITED STATES PATENT AND TRADEMARK OFFICE
CERTIFICATE OF CORRECTION

PATENT NO. : 5,323,252
DATED : June 21, 1994
INVENTOR(S) : AKIO YOSHIDA, ET AL.

It is certified that error appears in the above-identified patent and that said Letters Patent is hereby corrected as shown below:

COLUMN 6

Line 2, "electrodes;" should read --electrodes,--.

Signed and Sealed this

Twenty-second Day of November, 1994

Attest:

BRUCE LEHMAN

Attesting Officer    Commissioner of Patents and Trademarks